United States Patent [19]
Bashford et al.

[11] Patent Number: 6,135,962
[45] Date of Patent: Oct. 24, 2000

[54] METHOD AND APPARATUS FOR ADAPTIVE FILTERING BY COUNTING ACOUSTIC SAMPLE ZEROES IN ULTRASOUND IMAGING

[75] Inventors: Gregory R. Bashford, Menomonee Falls; Edward D. Nonnweiler; David D. Becker, both of Milwaukee; David John Muzilla, Mukwonago, all of Wis.

[73] Assignee: General Electric Company, Milwaukee, Wis.

[21] Appl. No.: 09/201,974

[22] Filed: Dec. 1, 1998

[51] Int. Cl.⁷ ........................................................ A61B 8/00
[52] U.S. Cl. .................................................................. 600/447
[58] Field of Search ..................................... 600/443, 442, 600/454, 455, 456, 449

[56] References Cited

U.S. PATENT DOCUMENTS 5,544,659  8/1996  Banjanin .................................. 600/455
5,664,575  9/1997  Banjanin et al. ........................ 600/455

Primary Examiner—Marvin M. Lateef
Assistant Examiner—Maolin Patel
Attorney, Agent, or Firm—Dennis M. Flaherty; Christina G. Cabou; Phyllis Y. Price

[57] ABSTRACT

An ultrasound imaging system having an adaptive spatial filter the filter coefficients of which, for particular image parameter sample, are determined by counting the number of neighboring image parameter samples having zero or near-zero values. If the number of zero or near-zero values in a data window is greater than a predetermined threshold, the data in the window is passed, not filtered. This filter has two advantages over other spatial filters. First, image parameter data samples having only zero or near-zero neighboring values (i.e., isolated "point noise") are not smeared. Second, boundaries such as the edge of color in a vessel (where the surrounding area is black, i.e., the color image parameter values are zero or near zero) are not smoothed as much as in conventional filters, preserving the sharpness of the edge.

20 Claims, 2 Drawing Sheets

METHOD AND APPARATUS FOR ADAPTIVE FILTERING BY COUNTING ACOUSTIC SAMPLE ZEROES IN ULTRASOUND IMAGING

FIELD OF THE INVENTION

This invention generally relates to the imaging of ultrasound scatterers. In particular, the invention relates to methods for filtering image parameter data in order to smooth the final ultrasound image.

BACKGROUND OF THE INVENTION

Premium medical diagnostic ultrasound imaging systems require a comprehensive set of imaging modes. These are the major imaging modes used in clinical diagnosis and include color flow Doppler and B mode. In the B mode, such ultrasound imaging systems create two-dimensional images of tissue in which the brightness of a pixel is based on the intensity of the echo return. Alternatively, in a color flow imaging mode, the movement of fluid (e.g., blood) or tissue can be imaged. Measurement of blood flow in the heart and vessels using the Doppler effect is well known. The phase shift of backscattered ultrasound waves may be used to measure the velocity of the backscatterers from tissue or blood. The Doppler shift may be displayed using different colors to represent speed and direction of flow.

In B-mode and color flow ultrasound imaging it is often desired to low-pass filter the incoming data in two dimensions in order to smooth the final image. It is known to use a spatial filter, which is normally implemented by "sliding" a filter "kernel" across incoming data in two dimensions. The data which corresponds to the filter kernel's position is the data "window". The center value of the data window is "under consideration". The kernel is made up of a matrix of filter coefficients. At each position, the point-by-point product of the data window and the filter coefficients is summed to give a new value, which replaces the value under consideration. In some cases it might be desired to "pass through" the data, i.e., leave it unaltered.

A problem with using a spatial filter to low-pass filter the acoustic data is that the low-level noise is smoothed as well. As a result isolated noise samples are smeared in two dimensions, leaving unattractive "blobs" on the screen. This problem can be alleviated by using an adaptive spatial filter, i.e., one whose coefficients are determined by changes in the incoming data. One known adaptive spatial filter controls the amount of smoothing as a function of the amplitude of the acoustic data. A drawback of this filter is that the data surrounding the filtered value, in particular the number of non-zero neighbors each sample has, are ignored.

SUMMARY OF THE INVENTION

The present invention is an ultrasound imaging system having an adaptive spatial filter the filter coefficients of which, for a particular image parameter sample, are determined by counting the number of neighboring image parameter samples having zero or near-zero values. If the number of zero or near-zero values in a data window is greater than a predetermined threshold, the data in the window is passed through, not filtered. This filter has two advantages over other spatial filters. First, image parameter data samples having only zero or near-zero neighboring values (i.e., isolated "point noise") are not smeared. Second, boundaries such as the edge of color in a vessel (where the surrounding area is black, i.e., the color image parameter values are zero or near zero) are not smoothed as much as in conventional filters, preserving the sharpness of the edge.

The method of the invention is implemented as a filtering block in the signal processing chain. This filter may be used in color flow and/or B-mode imaging. For both color flow and B-mode data, the filter is implemented after the image parameter has been extracted from the acoustic data. In the preferred embodiments, the filter operates on the image parameter data while it is in a conventional line or frame memory, post-detection (B-mode) or post-estimation (color flow mode), and before scan conversion. For B-mode images, the parameter is envelope magnitude; for color images, the parameter is one or a combination of velocity, variance and power. Alternatively, the filter could be implemented after scan conversion. Furthermore, the filter of the invention can be implemented as either hardware in the signal processing chain or software in a host computer or dedicated processor.

DETAILED DESCRIPTION OF THE PREFERRED EMBODIMENTS

Figure 1:
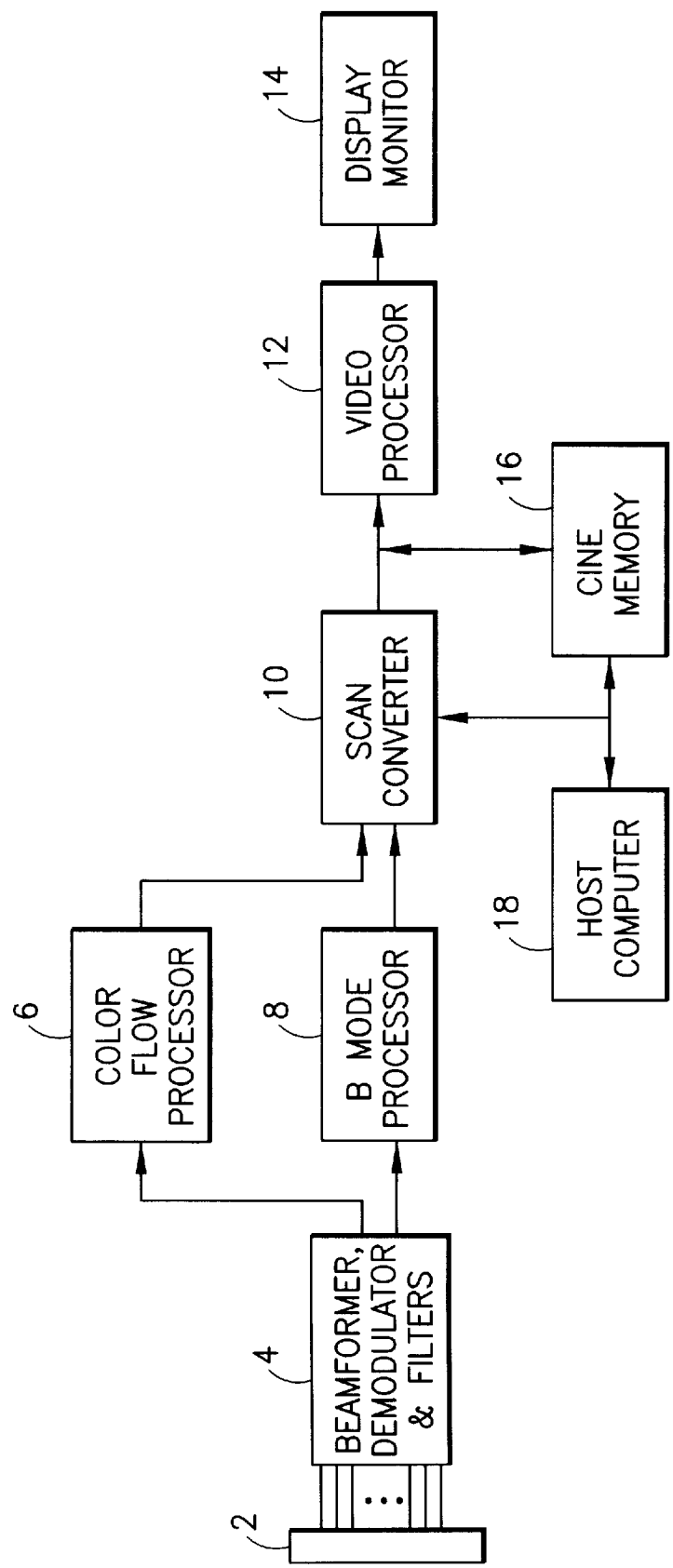
FIG. 1 is a schematic showing a block diagram of a general ultrasound imaging system which supports the preferred embodiments of the present invention.

One conventional ultrasound imaging system is generally depicted in FIG. 1. The main data path begins with the analog RF inputs to the beamformer board 4 from the transducer 2. The beamformer board 4 is responsible for the transmit and receive beamforming. The beamformer's signal inputs are the low-level analog RF signals from the transducer elements. The beamformer board 4, which comprises a beamformer, a demodulator and filters, outputs two summed digital baseband in-phase (I) and quadrature (Q) receive beams formed from acquired data samples. These data samples are derived from the reflected ultrasound from respective focal zones of the transmitted beams. The I and Q data is sent to FIR filters which are programmed with filter coefficients to pass a band of frequencies centered at the fundamental frequency $f_0$ of the transmit waveform or a (sub)harmonic frequency thereof.

The image data output from the filters is sent to the midprocessor subsystem, where it is processed according to the acquisition mode and output as processed vector data. Typically, the mid-processor subsystem comprises a color flow processor 6 and a B-mode processor 8. Alternatively, a digital signal processor or array of such processors can be programmed to process signals for both modes.

The B-mode processor 8 converts the baseband I and Q data from the beamformer board 4 into a log-compressed version of the signal envelope. The B-mode function images the time-varying amplitude of the envelope of the signal as a gray scale. The envelope of a baseband signal is the magnitude of the vector which I and Q represent. The I,Q phase angle is not used in the B-mode display. The magnitude of the signal is the square root of the sum of the squares of the orthogonal components, i.e., $(I^2+Q^2)^{1/2}$. The B-mode intensity data is output to the scan converter 10. The invention also has application in systems which detect the envelope of the RF signal without the intermediate steps of converting the RF signal to in-phase and quadrature components.

The scan converter 10 accepts the processed B-mode intensity data, interpolates where necessary, and converts the intensity data into X-Y format for video display. The scan-converted frames are passed to a video processor 12, which maps the video data to a gray-scale mapping for video display. A conventional ultrasound imaging system typically employs a variety of gray maps, which are simple transfer functions of the raw image data to display gray levels. The gray-scale image frames are then sent to the display monitor 14 for display.

The B-mode images displayed by monitor 14 are produced from an image frame of data in which each datum indicates the intensity or brightness of a respective pixel in the display. An image frame may, e.g., comprise a 256×256 data array in which each intensity datum is an 8-bit binary number that indicates pixel brightness. Each pixel has an intensity value which is a function of the backscatter cross section of a respective sample volume in response to interrogating ultrasonic pulses and the gray map employed. The displayed image is a sector scan representing the tissue and/or blood flow in a plane through the body being imaged.

The color flow processor 6 is used to provide a real-time two-dimensional image of blood velocity in the imaging plane. The frequency of sound waves reflecting from the inside of blood vessels, heart cavities, etc. is shifted in proportion to the velocity of the blood cells: positively shifted for cells moving towards the transducer and negatively for those moving away. The blood velocity is calculated by measuring the phase shift from firing to firing at a specific range gate. Instead of measuring the Doppler spectrum at one range gate in the image, mean blood velocity from multiple vector positions and multiple range gates along each vector are calculated, and a two-dimensional image is made from this information. The color flow processor 6 receives the summed left and right, complex I/Q data from the beamformer board 4 and processes it to calculate the mean blood velocity, variance (representing blood turbulence) and total prenormalization power for all sample volumes within an operator-defined region.

One of the primary advantages of Doppler ultra-sound is that it can provide noninvasive and quantitative measurements of blood flow in vessels. Given the angle θ between the insonifying beam and the flow axis, the magnitude of the velocity vector can be determined by the standard Doppler equation:

$$v = cf_d/(2f_0 \cos \theta) \quad (1)$$

where c is the speed of sound in blood, $f_0$ is the transmit frequency and $f_d$ is the motion-induced Doppler frequency shift in the backscattered ultra-sound signal.

The color flow estimates (velocity, variance and power) are sent to the scan converter 10, which converts the color flow image data into X-Y format for video display. The scan-converted frames are passed to the video processor 12, which basically maps the video data to a display color map for video display. The color flow image frames are then sent to the video monitor 14 for display. Typically, either velocity or power are displayed alone or velocity is displayed in conjunction with either power or turbulence.

The scan converter 10 accepts processed digital data from the color flow and B-mode processors, and then performs the coordinate transformation of the color flow and B-mode data from polar coordinate (R-θ) sector format or Cartesian coordinate linear format to appropriately scaled Cartesian coordinate display pixel data, which is stored in an X-Y display memory (not shown). Typically, color flow mode displays hundreds of adjacent sample volumes simultaneously, all laid over a black and white anatomical B-mode image and color-coded to represent each sample volume's velocity.

If the image to be displayed is a combination of one B-mode frame and one color flow frame, then both frames are passed to the video processor 12, which maps the B-mode data to a gray map and maps the color flow data to a color map for video display. In the final displayed image, the color pixel data is super-imposed on the gray-scale pixel data.

Successive frames of color flow and/or B-mode data are stored in a cine memory 16 on a first-in, first-out basis. Storage can be continuous or as a result of an external trigger event. The cine memory 16 is like a circular image buffer that runs in the background, capturing image data that is displayed in real time to the user. When the user freezes the system by operation of an appropriate device on an operator interface (not shown), the user has the capability to view image data previously captured in cine memory.

System control is centered in a host computer (i.e., master controller) 18, which accepts operator inputs through an operator interface (e.g., a control panel) and in turn controls the various subsystems. The host computer 18 performs system level control functions. It accepts inputs from the operator via the operator interface as well as system status changes (e.g., mode changes) and makes appropriate system changes. A system control bus (not shown) provides the interface from the host computer to the subsystems. A scan controller (not shown) provides real-time (acoustic vector rate) control inputs to the various subsystems. The scan controller is programmed by the host computer with the vector sequences and synchronization options for acoustic frame acquisitions. Thus, the scan controller controls the beam distribution and the beam density, transmitting the beam parameters defined by the host computer to the subsystems via a scan control bus (not shown).

Figure 2:
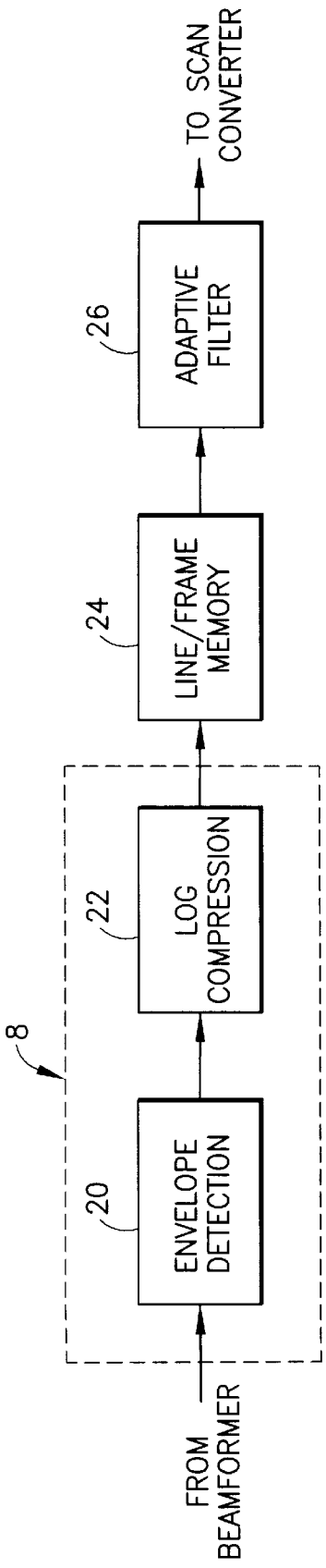
FIG. 2 is a schematic showing a block diagram of a B-mode signal processing chain in accordance with one preferred embodiment of the invention.

In accordance with a first preferred embodiment of the invention shown in FIG. 2, the B-mode intensity data is passed through an adaptive filter before scan conversion. As seen in FIG. 2, the I/Q components are input to the B-mode processor 8 from the beamformer board. The B-mode processor incorporates an envelope detector 20 for forming the envelope of the beamsummed receive signal by computing the quantity $(I^2+Q^2)^{1/2}$. The envelope of the signal undergoes some additional B-mode processing, such as logarithmic compression (block 22), to form B-mode intensity (i.e., envelope magnitude) data, which is output to a B-mode line/frame memory 24. The B-mode intensity data is then passed through an adaptive spatial filter 26 having a filter kernel $k_f$ which operates in a low-pass (smoothing) manner. The adaptive spatial filter 26, when implemented in a B-mode signal processing chain, is programmed to operate on only those B-mode intensity data windows having fewer than a predetermined number of zero or near-zero values.

Figure 3:
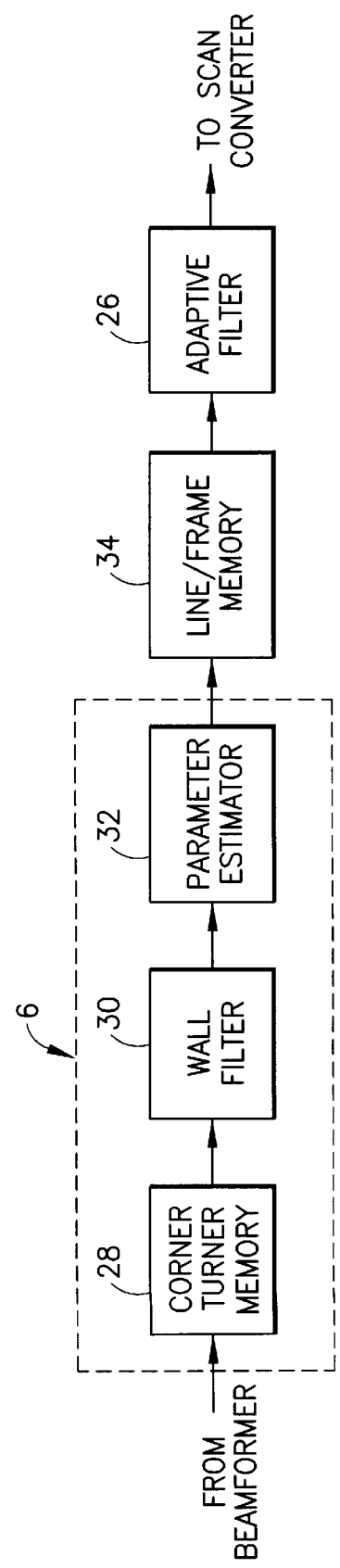
FIG. 3 is a schematic showing a block diagram of a color flow signal processing chain in accordance with another preferred embodiment of the invention.

Referring to FIG. 1, the basic signal processing chain for color flow imaging comprises an ultrasound transducer array 2, which is activated to transmit pulse sequences comprising tone bursts of length P which are fired repeatedly at the pulse repetition frequency (PRF). The return RF signals are detected by the transducer elements and received by the respective receive channels in the beamformer in block 4. The beamformer sums the delayed channel data and outputs a beamsummed signal, which is demodulated into in-phase and quadrature (I/Q) signal components by a demodulator in block 4. Referring to FIG. 3, the I/Q signal components are stored in a corner turner memory 28, whose purpose is to buffer data from possibly interleaved firings and output the data as vectors of points across firings at a given range cell. Data is received in "fast time", or sequentially down range (along a vector) for each firing. The output of the corner turner memory is reordered into "slow time", or sequentially by firing for each range cell. The resultant "slow time" I/Q signal samples are passed through respective wall filters 30, which reject any clutter corresponding to stationary or very slow-moving tissue. The filtered outputs are then fed into a parameter estimator 32, which converts the range cell information into the intermediate autocorrelation parameters N, D and R(0). N and D are the numerator and denominator for the autocorrelation equation, as shown below:

$$N = \sum_{i=1}^{M-1} (I_i Q_{i+1} - I_{i+1} Q_i) \quad (2)$$

$$D = \sum_{i=1}^{M-1} (I_i I_{i+1} + Q_i Q_{i+1}) \quad (3)$$

where $I_i$ and $Q_i$ are the demodulated, basebanded input data for firing i, and M is the number of firings in the packet. R(0) is approximated as a finite sum over the number of firings in a packet, as follows:

$$R(0) = \sum_{i=1}^{M-1} \frac{(I_i^2 + Q_i^2 + I_{i+1}^2 + Q_{i+1}^2)}{2} \quad (4)$$

A processor incorporated in block 32 converts N and D into a magnitude and phase for each range cell. The equations used are as follows:

$$|R(T)| = \sqrt{N^2 + D^2} \quad (5)$$

$$\phi(R(T)) = \tan^{-1}\left[\frac{N}{D}\right] \quad (6)$$

The parameter estimator 32 processes the magnitude and phase values into estimates of power, velocity and turbulence. The phase is used to calculate the mean Doppler frequency, which is proportional to the velocity as shown below; R(0) and |R(T)| (magnitude) are used to estimate the turbulence.

The mean Doppler frequency in hertz is obtained from the phase of N and D and the pulse repetition time T:

$$\bar{f} = \frac{1}{2\pi T}\tan^{-1}\left[\frac{N}{D}\right] = \frac{1}{2\pi T}(\phi(R(T))) \quad (7)$$

The mean velocity is calculated using Eq. (1). The turbulence may be calculated in the time domain as a second-order series expansion of the variance of the mean Doppler frequency. The time domain expression for turbulence involves calculating the zero-lag and one-lag autocorrelation functions, R(0) and R(T) respectively. The exact autocorrelation functions are approximated by finite sums over the known data in the number of firings in a packet:

$$\sigma^2 = \frac{2}{(2\pi T)^2}\left[1 - \frac{|R(T)|}{R(0)}\right] \quad (8)$$

The mean value signal $\phi(R(T))$ is an estimate of the mean Doppler frequency shift of the flowing reflectors, which in turn is proportional to the mean blood flow velocity. The variance signal $\sigma^2$ indicates the frequency spread of the flow signal component of the baseband echo signal. This value is indicative of flow turbulence, since constant flow has a very narrow range of velocities, while turbulent flow is a mixture of many velocities. To indicate the strength of the signal from the flowing reflectors, the signal R(0) indicates the amount of the returned power in the Doppler-shifted flow signal.

The color flow estimates are output to a color line/frame memory. The color flow data is then passed through an adaptive spatial filter 26 having the functionality previously described in connection with the B-mode signal processing chain shown in FIG. 2. The adaptive spatial filter 26, when implemented in a color flow signal processing chain, is programmed to operate on only those velocity, power or turbulence (variance) data windows having fewer than a predetermined number of zero or near-zero values.

In accordance with the preferred embodiments shown in FIGS. 2 and 3, the adaptive spatial filter 26 first counts the number of zero or near-zero image parameter values in the data window. A value which was "near-zero" would be defined beforehand. For example, for 8-bit intensity values, intensity values $-3 \leq x \leq 3$ could be considered "near-zero". This zero (or near-zero) count would determine the filter coefficients according to a predetermined rule. A simple example would be to pass through data which contained a number of zeroes exceeding a programmable threshold. A more complicated example is to provide more smoothing as the number of non-zero data points increases.

As a particular example of the former case, consider the filter kernel ($k_f$) and image parameter data (A) given below:

$$k_f = \begin{bmatrix} 1 & 2 & 1 \\ 2 & 4 & 2 \\ 1 & 2 & 1 \end{bmatrix} \times \frac{1}{16}$$

$$A = \begin{bmatrix} 0 & 0 & 0 & 0 & 0 & 0 & 0 & 0 & 0 & 0 \\ 0 & 0 & 3 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 2 & 0 & 0 & 0 & 0 \\ 0 & 0 & 0 & 0 & 0 & 0 & 0 & 0 & 0 & 1 \\ 0 & 0 & 0 & 0 & 0 & 0 & 0 & 0 & 1 & 2 \\ 0 & 1 & 0 & 0 & 0 & 0 & 0 & 1 & 2 & 3 \\ 0 & 0 & 0 & 0 & 0 & 0 & 1 & 2 & 3 & 4 \\ 0 & 0 & 0 & 0 & 0 & 1 & 2 & 3 & 4 & 5 \\ 0 & 0 & 0 & 0 & 1 & 2 & 3 & 4 & 5 & 6 \end{bmatrix}$$

The filter kernel $k_f$ is a 3×3 kernel which operates in a low-pass (smoothing) fashion. The matrix A, representing image parameter data, contains three isolated points (having image parameter values 1, 2 and 3) and image parameter values representing an edge in the lower right-hand corner. Let us assume, for the purpose of this example only, that the adaptive filter has been programmed to operate on only data windows having fewer than 5 zeroes and to pass through other data windows i.e., without filtering. Also assume, for the purpose of this example only, that only values of zero count as "near-zero" values.

The filtering would proceed by positioning the filter kernel in the upper left-hand corner, so that $k_f$ lines up with the image parameter data there, forming the data window $$\begin{bmatrix} 0 & 0 & 0 \\ 0 & 0 & 3 \\ 0 & 0 & 0 \end{bmatrix}$$

Since there are 8 zeroes in this window, the value under consideration, namely, "3", is allowed to pass through unfiltered. When the filter kernel has "slid down" further, it will be over the isolated value "1" in the matrix, giving the data window $$\begin{bmatrix} 0 & 0 & 0 \\ 0 & 1 & 0 \\ 0 & 0 & 0 \end{bmatrix}$$

Since there are 8 zeroes in this window also, the value under consideration, namely, "1", is allowed to pass through unfiltered. The same is true whenever the filter kernel slides over any of the three isolated samples. This technique prevents the isolated noise from being smeared over the image, which smearing would cause isolated noise to increase in size on the display screen.

Next we consider the case when the filter kernel approaches the data edge in the lower right-hand corner. For example, at one point the filter will be over the data window $$\begin{bmatrix} 0 & 0 & 0 \\ 0 & 0 & 1 \\ 0 & 1 & 2 \end{bmatrix}$$

in which there are 6 zeroes, so again the value under consideration, namely, "0", is preserved. If it were not, it would be replaced by the sum of the point-by-point product of the filter kernel and the data window, which has a value of "3/8". The effect of applying the spatial filter to the zeroes adjacent the edge would be to "spread" the edge into the adjacent zeroes. However, when the filter has slid down one more sample, it will be over the data window $$\begin{bmatrix} 0 & 0 & 1 \\ 0 & 1 & 2 \\ 1 & 2 & 3 \end{bmatrix}$$

Since this window has only 3 zeroes, the value under consideration, namely, "1", is replaced by "17/16". In this case the edge boundary has not changed in position, but rather has only been altered slightly in amplitude. As the filter kernel moves farther into the region with non-zero data, the filter will always be applied since there are no zeroes.

The invention is not limited to use in ultrasound imaging system, but rather can be employed to spatially filter frames of any type of image parameter values, without regard to the mode used to acquire such imaging data.

The foregoing preferred embodiments have been disclosed for the purpose of illustration. Variations and modifications of the concept of the invention will be readily apparent to persons skilled in the art. For example, the invention is not limited to adaptive filters having a 3×3 filter kernel, but rather can be extended to filter kernels of any size and configuration. All such variations and modifications are intended to be encompassed by the claims set forth hereinafter.

What is claimed is:

1. An imaging system comprising:
   a memory for storing a frame of image parameter values;
   a spatial filter adapted to filter only those data windows, of a multiplicity of overlapping data windows of the same configuration covering said frame, which satisfy the criterion that the data window has fewer than a predetermined number of image parameter values which are less than a predetermined threshold, wherein said spatial filter does not filter data windows of said frame which do not satisfy said criterion; and
   a display device for displaying an image signal derived from the image parameter values output by said spatial filter.

2. The imaging system as recited in claim 1, wherein said image parameter is ultrasound B-mode intensity data.

3. The imaging system as recited in claim 1, wherein said image parameter is ultrasound velocity data.

4. The imaging system as recited in claim 1, wherein said image parameter is ultrasound power data.

5. The imaging system as recited in claim 1, wherein said image parameter is ultrasound turbulence data.

6. The imaging system as recited in claim 1, further comprising:
   an ultrasound transducer array comprising a multiplicity of transducer elements;
   a transmit beamformer for pulsing selected transducer elements during a series of transmit firings;
   a receive beamformer coupled to selected transducer elements of said transducer array for acquiring a respective receive signal subsequent to each transmit firing;
   a signal processor programmed to form said frame of image parameter values from said receive signals; and
   a scan converter for converting said frame of image parameter values into said image signals for display.

7. The imaging system as recited in claim 1, wherein said spatial filter is designed to low-pass filter said frame of image parameter values.

8. An imaging system comprising:
   a memory for storing a frame of image parameter values;
   a filter programmed to perform the steps of:
   (a) forming a data window comprising an array of said image parameter values having a predetermined configuration;
   (b) determining the number of said image parameter values in said data window having a value less than a predetermined value threshold;
   (c) if said number is less than a predetermined count threshold, forming a point-by-point product of said data window and a filter kernel comprising an array of filter coefficients;
   (d) substituting said product in said frame for one of said image parameter values in said data window;
   (e) if said number is not less than said predetermined count threshold, passing said image parameter values of said data window without change; and
   (f) repeating steps (a)–(e) for overlapping data windows comprising other arrays of said image parameter values having said predetermined configuration to produce a frame of filtered image parameter values, and
   a display device for displaying an image derived from said frame of filtered image parameter values.

9. The imaging system as recited in claim 8, wherein said image parameter is ultrasound data.

10. The imaging system as recited in claim 9, further comprising:
an ultrasound transducer array comprising a multiplicity of transducer elements;
a transmit beamformer for pulsing selected transducer elements during a series of transmit firings;
a receive beamformer coupled to selected transducer elements of said transducer array for acquiring a respective receive signal subsequent to each transmit firing;
a signal processor programmed to form said frame of image parameter values from said receive signals; and
a scan converter for converting said frame of image parameter values into said image signals for display.

11. The imaging system as recited in claim 8, wherein said filter coefficients are selected for low-pass filtering of said frame of image parameter values.

12. An imaging system comprising:
a memory for storing a frame of image parameter values;
means for forming overlapping data windows covering said frame of image parameter values, each data window comprising an array of said image parameter values having a predetermined configuration;
means for determining the number of said image parameter values in each data window having a value less than a predetermined value threshold;
means for forming a respective point-by-point product of each data window and a filter kernel comprising an array of filter coefficients;
means for substituting said respective product in said frame for one of said image parameter values in said respective data window;
means for enabling said product forming means and said substituting means for each data window only if the respective number of image parameter values in said respective data window is less than a predetermined count threshold, resulting in formation of a frame of filtered image parameter values; and
a display device for displaying an image derived from said frame of filtered image parameter values.

13. The imaging system as recited in claim 12, wherein said image parameter is ultrasound data.

14. The imaging system as recited in claim 12, wherein said filter coefficients are selected for low-pass filtering of said frame of image parameter values.

15. A method for displaying image parameter data, comprising the steps of:
storing a frame of image parameter values having a characteristic that when said image parameter values of said frame are arrayed into overlapping data windows having a predetermined configuration, at least some of said data windows have at least a predetermined number of image parameter values which are less than a predetermined threshold;
filtering only those data windows of said frame which satisfy the criterion that the data window has fewer than said predetermined number of image parameter values which are less than said predetermined threshold and not filtering data windows of said frame which do not satisfy said criterion, thereby producing a new frame of image parameter values; and
displaying an image signal derived from said new frame of image parameter values.

16. The method as recited in claim 15, wherein said image parameter is ultrasound data.

17. The method as recited in claim 15, wherein said filtering step low-pass filters said frame of image parameter values.

18. A method for displaying image parameter data, comprising the steps of:
(a) storing a frame of image parameter values having a characteristic that when said image parameter values of said frame are arrayed into overlapping data windows having a predetermined configuration, at least some of said data windows have at least a predetermined number of image parameter values which are less than a predetermined threshold;
(b) forming a data window comprising an array of said image parameter values having said predetermined configuration;
(c) determining the number of said image parameter values in said data window having a value less than said predetermined threshold;
(d) if said number is less than a predetermined count threshold, forming a point-by-point product of said data window and a filter kernel comprising an array of filter coefficients;
(e) substituting said product in said frame for one of said image parameter values in said data window;
(f) if said number is not less than said predetermined count threshold, passing said image parameter values of said data window without change; and
(g) repeating steps (b)–(f) for data windows comprising other arrays of said image parameter values to produce a frame of filtered image parameter values, and
(h) displaying an image derived from said frame of filtered image parameter values.

19. An ultrasound imaging system comprising:
an ultrasound transducer array comprising a multiplicity of transducer elements;
a transmit beamformer for pulsing selected transducer elements during a series of transmit firings focused at different transmit focal zones in a scan plane;
a receive beamformer coupled to selected transducer elements of said transducer array for acquiring respective receive signals subsequent to said respective transmit firings;
a signal processor programmed to acquire a frame of image parameter values from said receive signals;
a memory for storing said frame of image parameter values;
a low-pass spatial filter adapted to filter only those data windows, of a multiplicity of overlapping data windows of the same configuration covering said frame, which satisfy the criterion that the data window has fewer than a predetermined number of image parameter values which are less than a predetermined threshold, wherein said spatial filter does not filter data windows of said frame which do not satisfy said criterion; and
a display device for displaying an image signal derived from the image parameter values output by said low-pass spatial filter.

20. A method for spatially filtering image parameter data, comprising the steps of:
storing a frame of image parameter values having a characteristic that when said image parameter values of said frame are arrayed into overlapping data windows having a predetermined configuration, at least some of said data windows have at least a predetermined number of image parameter values which are less than a predetermined threshold; and filtering only those data windows of said frame which satisfy the criterion that the data window has fewer than said predetermined number of image parameter values which are less than said predetermined threshold and not filtering data windows of said frame which do not satisfy said criterion.

* * * * *